United States Patent [19]

Wargo

[11] 4,413,282

[45] Nov. 1, 1983

[54] TELEVISION GHOST SIGNAL DETECTION DURING THE VIDEO INFORMATION INTERVAL

[75] Inventor: Robert A. Wargo, Ringoes, N.J.

[73] Assignee: RCA Corporation, New York, N.Y.

[21] Appl. No.: 328,434

[22] Filed: Dec. 7, 1981

[30] Foreign Application Priority Data

Apr. 6, 1981 [GB] United Kingdom ............... 8110693

[51] Int. Cl.$^3$ .............................................. H04N 5/21
[52] U.S. Cl. ................................... 358/167; 358/905; 375/101; 455/65
[58] Field of Search ......................... 358/36, 167, 905; 455/65; 328/162, 165; 375/101

[56] References Cited

U.S. PATENT DOCUMENTS 4,216,496  8/1980  Lothian et al. ....................... 358/83

OTHER PUBLICATIONS

The Dick-Adaptive Multipath Equalization for TV Broadcasting, IEEE Transactions on Consumer Electronics, vol. CE 23, #2, May 1977, pp. 175-181.
"A Fully Automatic Ghost Canceller" by S. Makino et al., IEEE Transactions on Consumer Electronics, vol. CE-24, No. 3, Aug. 1978, pp. 267-271.

Primary Examiner—Joseph A. Orsino, Jr.
Attorney, Agent, or Firm—Eugene M. Whitacre; Paul J. Rasmussen; Peter M. Emanuel

[57] ABSTRACT

A method and apparatus are presented for detecting the presence of ghost signal contamination of a video signal by examining the picture information interval of the video signal. A baseband video signal is detected and examined to detect signal transitions. Transitions of the main video signal of a given polarity will be followed by corresponding transitions of a ghost signal. The time intervals between ones of the transitions are measured and stored. If a ghost signal is present, the time interval between corresponding ghost and signal transitions will occur more frequently than the relatively random time intervals between transitions of the main signal and the ghost signal considered separately. By correlating the time interval measurements, the recurring time interval between corresponding main and ghost signal transitions can be identified. This information may then be used to adjust the delay of a delay line in a ghost cancellation system.

14 Claims, 10 Drawing Figures

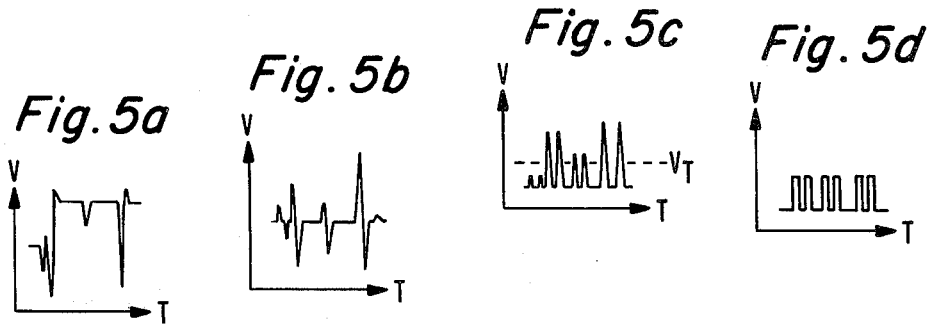
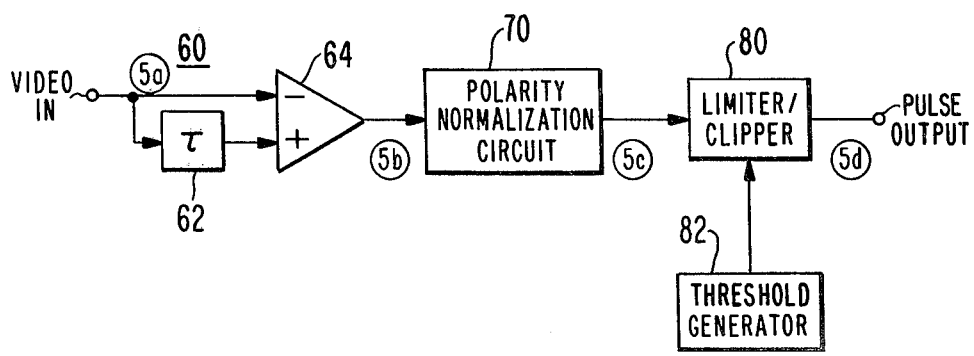
Fig. 3
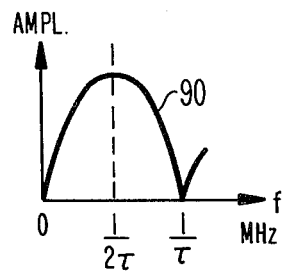
Fig. 6

TELEVISION GHOST SIGNAL DETECTION DURING THE VIDEO INFORMATION INTERVAL

Conventional television ghost signal detection is accomplished by examining a reference or training signal contained in the vertical retrace interval of a baseband video signal. This invention relates to a method and apparatus for detecting the presence of a ghost signal during the active video information interval of the baseband video signal.

Television reception has long been plagued by the reception of undesired multiple signals. These undesired signals, reflected from buildings and other large objects, appear as delayed versions of the direct television signal, and are commonly referred to as ghost signals in the reproduced image. The ghost signals will be delayed from the direct signal as a function of the relationship of the signal path lengths between the direct and the ghost signals. When the main direct signal and the ghost signal are reproduced by the television receiver, the lesser amplitude ghost signal components will appear as a shadowy image offset from the main image by a distance on the screen which is a function of the ghost signal delay with respect to the main signal.

Numerous techniques have been proposed for eliminating ghost signals within the television receiver. Virtually all of these techniques utilize the common principle of delaying the main signal so that it is in time coincidence with the ghost signal. The delayed main signal is then attenuated so that its amplitude is the same as that of the ghost signal. This signal is then inverted to produce what is known as pseudo-ghost signal. The pseudo-ghost signal is then added to the received signal to substantially cancel the ghost signal.

The first step in the generation of the pseudo-ghost signal is to identify the presence of the ghost signal and its delay, or location in time, with respect to the main signal. This step is commonly accomplished by sensing the characteristics of a component of the video signal of known characteristics, generally referred to as a training signal. The training signal is followed in time by a video signal interval which contains no picture information. If the video signal is contaminated by a ghost signal, a corresponding ghost of the training signal will appear during this interval and the ghost may therefore be readily detected and analyzed. Typical training signal intervals used for ghost detection and cancellation include line 266 of the vertical synchronizing interval, and the lines of the vertical retract interval following the vertical synchronizing pulses. Specially transmitted pulses may also be inserted into unused lines of the vertical retrace interval, such as sine-squared pulses.

The use of the training signal for ghost detection requires that the training signal be followed by an appreciable portion of a video line interval containing no picture information. The length of this inactive video signal portion following the training signal determines the range of the ghost detector. For instance, if the portion is only one-half line long, only ghost signals delayed from the main video signal by one-half line or less are subject to detection. Since such inactive video signal portions of significant line length only occur during the vertical blanking interval, the proposals for training signals generally only consider locating training signal intervals in the vertical blanking interval of the video signal.

A disadvantage in the use of a vertical blanking interval training signal arises from the fact that the vertical blanking interval occurs at only a television signal field rate. This relatively low repetition rate means that the video signal can be examined for ghost signal contamination only at relatively infrequent intervals. Numerous signal samples may be required to fully examine the signal line portion following the training signal to detect the presence of a ghost signal. Furthermore, additional signal samples may be necessary for correlation to positively identify the presence of the ghost signal. Thus, the positive detection of a ghost signal and its subsequent cancellation may cause the deghosting system to have an undesirably slow response, which can be particularly disturbing in the presence of moving ghost signals, such as those that may be caused by signal reflection from aircraft. Accordingy, it is desirable to provide a ghost detection system which is capable of fast and positive determination of the presence of a ghost signal.

In accordance with the principles of the present invention, a baseband video signal is processed to detect luminance signal transitions during the active video signal portion of the television signal. The transitions are represented by high frequency edges of the luminance signal. Transitions of both polarities (i.e., white-to-black transitions or black-to-white transitions) may be detected or, alternatively, only transitions of one polarity may be detected. If transitions of both polarities are utilized, those of one polarity may be inverted to produce a sequence of transitions normalized to a single polarity. The individual transitions are then converted to pulses, producing a position-modulated pulse train.

The pulse train is then correlated to determine the time intervals between ones of the pulses in the sequence. The time interval measurements are stored and analyzed to determine if there is any significant pattern to them. If the video signal is not contaminated by a ghost signal, the time interval measurements should exhibit a relatively random pattern of values. However, if the video signal is contaminated by a ghost signal, transitions of the main video signal will be followed by corresponding transitions of the ghost signal, each of which is delayed from its corresponding main signal by a relatively constant time interval. In this case, a significant number of time interval measurements of equal value, corresponding to the time interval between the main and ghost signals, will emerge from the otherwise random pattern over a given sampling interval (e.g., one field). This time interval measurement represents the delay of the ghost signal with respect to the main video signal. A delay line may then be adjusted in accordance with the identified ghost delay to delay the main signal in preparation for the generation of a pseudo-ghost signal in a ghost cancellation system.

In accordance with a further aspect of the present invention, apparatus is provided for performing the above method of active video signal ghost detection. The baseband video signal is applied to the input of a signal detail detector, which detects the signal transitions and produces the position-modulated pulse train. The pulse train is applied to an auto-correlator, which measures the time intervals between ones of the transition-representative pulses of the pulse train. The auto-correlator generates a signal indicative of a pattern of the measured time intervals between ones of the pulses. A microprocessor operates in conjunction with the auto-correlator to respond to the pattern indication signal to adjust the delay of a delay line in a ghost cancellation system for the generation of a properly timed pseudo-ghost signal.

In the drawings:

FIG. 3 is a block diagram of an analog detail detector;

FIGS. 5a–5d illustrate waveforms depicting the operation of the detail detector of FIG. 3;

FIG. 6 is a response characteristic used to illustrate the operation of the arrangement of FIG. 4.

Figure 1:
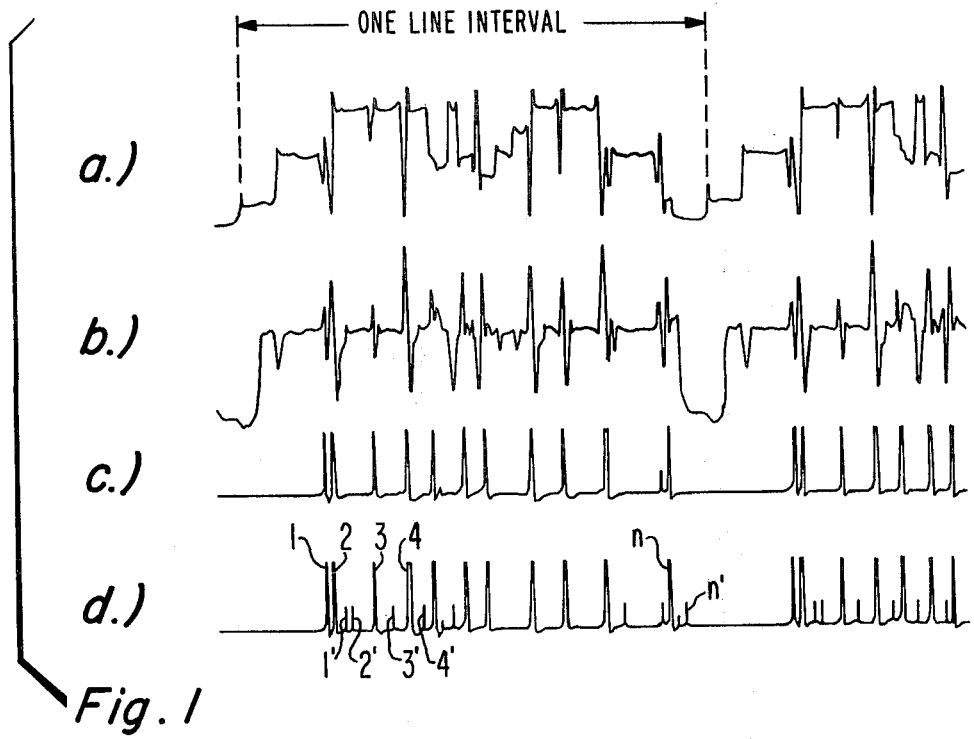
FIG. 1 shows waveforms illustrating the principles of the invention.

The waveforms of FIG. 1 illustrate the principles of the present invention. FIG. 1a shows one line interval of a typical video signal. The signal is seen to contain numerous random high frequency transitions from one level to another. When the signal of FIG. 1a is differentiated, the high frequency transitions are preserved, as shown in FIG. 1b. In FIG. 1c, the positive-going transitions of FIG. 1b are converted to a sequence of position-modulated pulses corresponding to the transitions. The time intervals between these pulses are seen to exhibit no distinct pattern.

If the waveform of FIG. 1a is contaminated by a ghost signal, however, a different pulse sequence will be produced, as shown in FIG. 1d. (For ease of illustration, the pulses corresponding to ghost signal transitions are shown at a smaller amplitude than the main signal pulses, although it is understood that all pulses will typically be of the same amplitude.) In FIG. 1d, main signal pulse 1 is separated from ghost signal pulse 1' by a given time interval. Main signal pulses 2, 3, 4 . . . n are likewise separated from corresponding ghost signal pulses 2', 3', 4' . . . n' by the same time interval.

The given time interval will be detected between pulses 1 and 1', 2 and 2', 3 and 3', and 4 and 4', as well as numerous other main and ghost pulses. Over a number of line intervals, this relatively constant time interval between respective main and ghost signal pulses will be detected a sufficiently significant number of times to permit the delay of the ghost signal to be positively identified.

Figure 2:
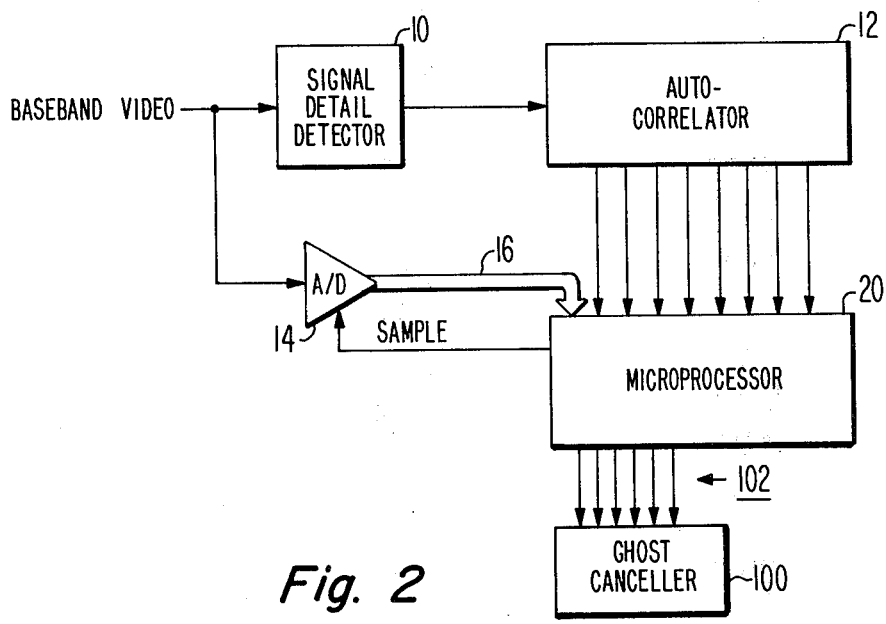
FIG. 2 is a block diagram of a ghost signal detection system constructed in accordance with the principles of the present invention.

Apparatus for implementing the method of ghost detection of the present invention is shown in FIG. 2. A baseband video signal is applied to a signal detail detector 10, which converts high frequency transitions of the luminance signal into a sequence of position-modulated pulses. The pulses are then applied to an auto-correlator 12, which measures the time intervals between sequential ones of the pulses. These measurements are supplied to a microprocessor 20, which analyzes the measurement data to determine whether a particular measurement is statistically dominant over all others. If a ghost delay time is identified, the microprocessor will provide this information to a ghost cancellation system 100 by way of delay select output lines 102. For instance, the microprocessor can select the appropriate tap of a tapped delay line by way of a tap select switch, as described in U.S. patent application Ser. No. 230,309, entitled "TELEVISION GHOST DETECTOR AND CANCELLATION SYSTEM CONTROLLED OVER SEVERAL LINES OF THE VERTICAL RETRACE INTERVAL", filed Jan. 30, 1981.

The microprocessor 20 may also be used to perform a validation check of the identified ghost delay time during the vertical retrace interval. For instance, the video signal can be applied to an analog-to-digital converter 14, which is activated by the microprocessor to sample line 266 of a video field, a commonly-used training signal interval for ghost detection. The digital representation of line 266 is applied to the microprocessor over lines 16. The microprocessor will examine the line 266 information at time locations delayed from transitions of the main line 266 signal by the predicted time interval to verify the presence of a ghost of the main signal. This prevents the system from being fooled by a repetitive video pattern, such as a checkerboard scene. The microprocesor 20 can then determine the characteristics of the ghost signal at these time locations (e.g., its phase and amplitude with respect to the main signal) if a ghost signal is present, or may determine a false identification. A false identification, as indicated by the absence of a ghost signal at the predicted line location, will prevent the generation of a delay select signal for the ghost cancellation system, and causes the microprocessor to reset the auto-correlator 12 to search again for a ghost signal delay interval.

An analog signal detail detector, suitable for use in the arrangement of FIG. 2, is illustratively shown in block diagram form in FIG. 3. A baseband video signal, such as that shown in FIG. 5a, is applied to the input of a transversal filter 60, including a delay element 62 and a comparator 64. The delay element 62 typically provides a delay of approximately 250 nanoseconds to the input signal at one input of comparator 64, giving the transversal filter a response characteristic peaked around 2 MHz. The transversal filter will then act in the manner of a differentiator to pass high frequency transition information, illustratively shown in FIG. 5b. If it is desired to utilize both transition polarities, a polarity normalization circuit 70 is used to convert the transition information to a common polarity, as shown in FIG. 5c. The transition information is then applied to a limiter/clipper 80, which converts the transition information into a sequence of pulses, as shown in FIG. 5d. A threshold generator 82 is used to select transitions above a given magnitude, thereby controlling the sensitivity of the detector, as shown by threshold level $V_T$ in FIG. 5c. The pulse sequence shown in FIG. 5d and produced at the output of the detail detector of FIG. 3 is seen to comprise pulses representative of the times of occurrence of transitions of the input video signal having a magnitude greater than $V_T$.

Figure 4:
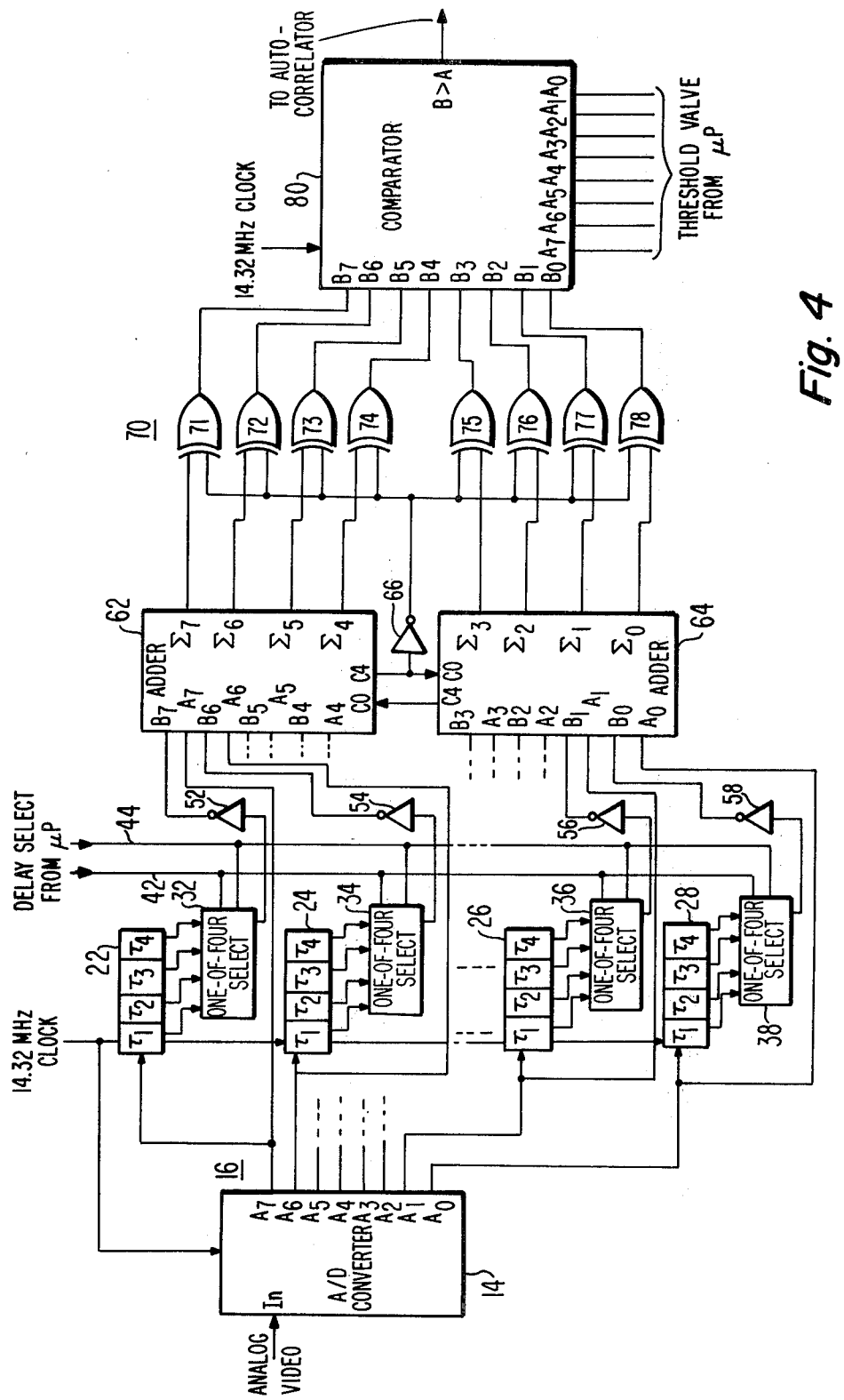
FIG. 4 is a block diagram of a digital detail detector.

A digital detail detector, suitable for use in the arrangement of FIG. 2, is illustratively shown in FIG. 4. A baseband video signal, such as that shown in FIG. 5a, is applied to the input of analog-to-digital converter 14. The analog-to-digital converter 14 continuously samples the video signal in response to a clock signal at a rate which satisfies the Nyquist criterion of the signal to be processed. In this example, the clock signal of 14.32 MHz is four times the frequency of the NTSC color subcarrier. Digital samples, in the form of eight bit words ($A_7$ . . . $A_0$) are produced at the output of the analog-to-digital converter 14.

The eight output lines of the analog-to-digital converter 14 are applied to the eight "A" inputs of two adders 62 and 64, and to eight delay line shift registers, four of which are shown in FIG. 4 (shift registers 22, 24, 26 and 28). The digital signal information is clocked through the shift registers by the 14.32 MHz clock, and appears at four outputs of each register. The shift registers thus produce digital signal information delayed by one, two, three, and four clock cycles at their outputs. One output of each shift register is chosen by one-of-four select switches or data multiplexers 32, 34, 36 and 38 and is coupled to a respective "B" input of adders 62 and 64 by way of inverters 52, 54, 56 and 58. The one-of-four select switches 32, 34, 36 and 38 are controlled by signals supplied by control lines 42 and 44 from the microprocessor 20 of FIG. 1. The carry-out output C4 of adder 64 is coupled to the carry-in input C0 of adder 62, and the carry-out output C4 of adder 62 is coupled to the carry-in input C0 of adder 64. The adders 62 and 64 produce an eight-bit sum signal of delayed and undelayed signals at their outputs $\Sigma_7 \ldots \Sigma_0$.

The outputs of adders 62 and 64 are coupled to respective inputs of exclusive-OR gates 71–78 of an array 70 of exclusive-OR gates. A second input of each exclusive-OR gate receives an inverted carry-out signal from adder 62 by way of an inverter 66. The outputs of the exclusive-OR gates 71–78 are coupled to the "B" inputs of a digital comparator 80. A digital threshold value is applied to the "A" inputs of the comparator 80 by the microprocessor 20. The comparator 80 produces a pulse at its B>A output when it is clocked by the 14.32 MHz clock and the value of the signal information word at its "B" inputs exceeds the threshold value at its "A" inputs.

The shift registers 22–28, the one-of-four select switches 32–38, the inverters 52–58, and the adders 62 and 64 together comprise an adaptive transversal filter for the digital information provided by the analog-to-digital converter 14. The transversal filter exhibits a response characteristic as shown in FIG. 6 by curve 90, where $\tau$ is the delay provided by the shift registers, select switches, and inverters 52–58. The delay $\tau$ is the delay between the analog-to-digital converter 14 and the "B" inputs of the adders 62 and 64. The frequencies of maximum and minimum signal attenuation $1/\tau$ and $\frac{1}{2}\tau$, respectively, are determined by the delay select signals on lines 42 and 44. For example, when the signals on lines 42 and 44 cause the one-of-four select switches 32–38 to couple the outputs of shift register stages $\tau_4$ to the adders, the maximum signal attenuation frequency will be 1/279nsec, or 3.58 MHz, which is the color subcarrier frequency in the NTSC system. The transversal filter will thereby attenuate the chrominance information of an NTSC television signal, and will pass the relatively higher frequency luminance information of the NTSC signal, located about the color subcarrier, which is the information to be utilized by the ghost signal detector of this invention.

In the digital notation used in the embodiment of FIG. 4, a logical "1" carry-out signal from adder 62 is taken to indicate a "positive" sum, and a logical "0" is taken to denote a "negative" sum. The inverters 52–58 of the transversal filter one's complement the delayed signal information at the inputs of the adders. The carry-out signal C4 of the higher order bit adder 62 is a logical "1" for positive signal values and, by virtue of the look-ahead capability of the adders, this logical "1" value is carried into lower order bit adder 64 to provide a two's complementing of the signal information at the "B" inputs of the adders. This two's complementing accomplishes subtraction of the delayed signal information from the undelayed information at the outputs of the adders for positive sum values.

When the output signal of the adders has a positive value, the logical "1" carry-out of adder 62 is inverted by inverter 66 and applied to the exclusive-OR gates 71–78. The exclusive-OR gates will then pass positive signal values to comparator 80 without modification. If, however, the output signal of the adders is negative, the output of C4 of adders 62 is a logical zero, which provides a carry-in C0 of zero to adder 64 and is applied to the exclusive-OR gates in inverted form as a logical "1". The exclusive-OR gates will then invert, or one's complement the signal values between the adders and the comparator, which effectively normalizes the adder output signals to all "positive" values of the chosen digital notation.

The comparator 80 compares the signal values with a threshold value and produces a pulse when the signal transitions exceed the threshold provided by the microprocessor. The microprocessor can change the threshold value to change the sensitivity of the detail detector in accordance with a type of analysis being performed. For instance, if no ghost signal is being detected at a given threshold value, the microprocessor can lower the threshold value, causing more pulses to be produced by the comparator for the auto-correlator in the ghost detector system. A weak ghost signal may thereby be detected. Alternatively, if a ghost signal has been detected, the threshold level can be altered to search for secondary ghost signals.

An embodiment of the digital detail detector of FIG. 4 has been built and tested as part of a ghost signal detector system constructed in accordance with the principles of the present invention. Experience with the system has shown that ghost detection is enhanced by analyzing only transition of one polarity in the luminance signal, rather than using a normalized signal of transition of both polarities. The embodiment of FIG. 4 is easily modified to produce pulses representative of only positive signal transitions by replacing the exclusive-OR gates with AND gates, and eliminating inverter 66 so that a positive carry-out signal C4 from adder 62 enables the transmission of positive transition information to the comparator 80.

Figure 7:
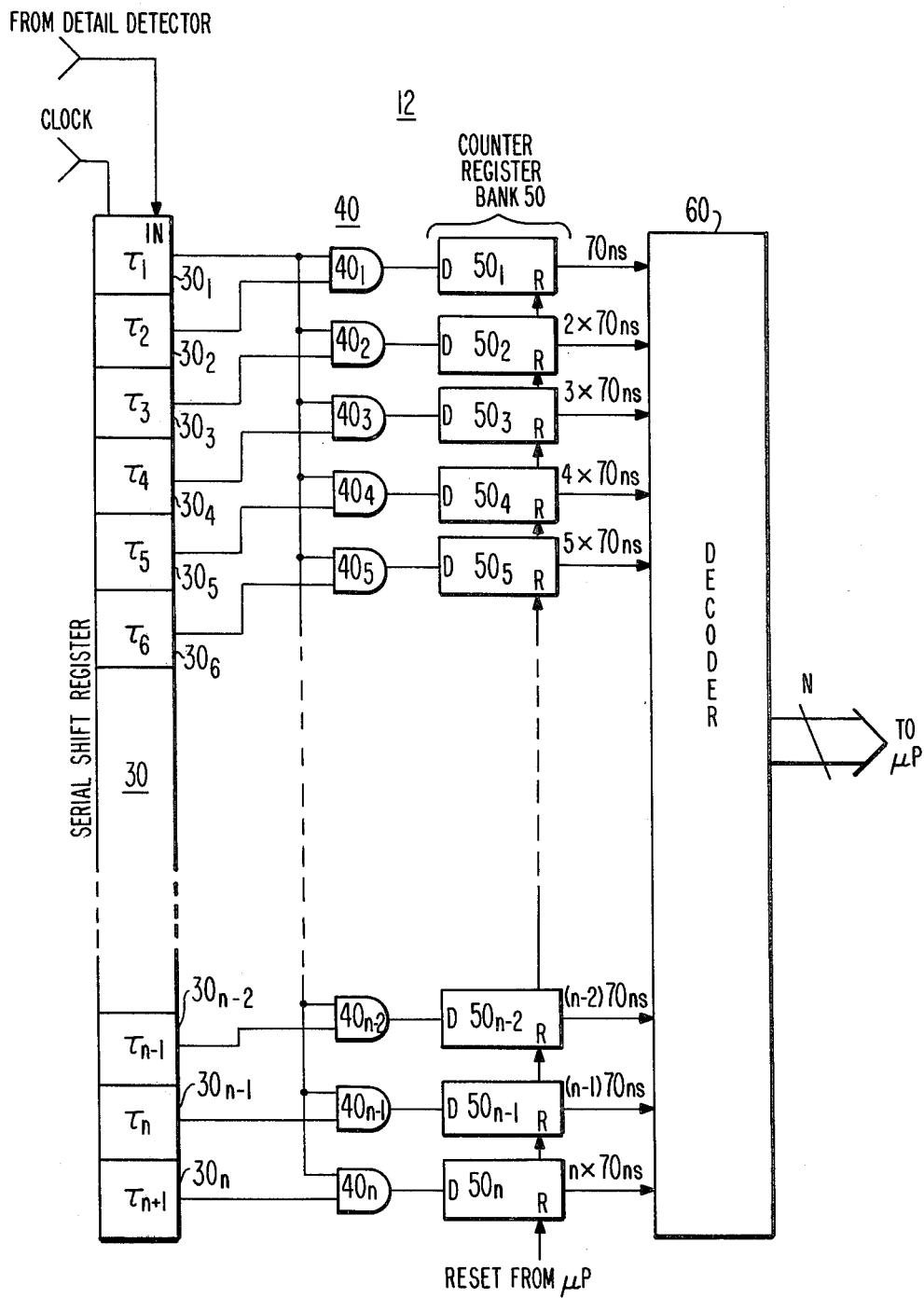
FIG. 7 is a block diagram of a digital auto-correlator.

An embodiment of the auto-correlator 12 of FIG. 2 is shown in FIG. 7. The pulse train from the signal detail detector 10 is shifted into a serial register 30 by a clock signal. The output of the first shift register stage 30 is coupled to one input of every AND gate in an array of AND gates 40. The output of every other shift register stage is coupled to a second input of respective ones of the AND gates. There is one less AND gate than shift register stages in this embodiment.

The outputs of the AND gates 40 are coupled to respective inputs of an equal number of counters of a counter register bank 50. Outputs of the counters are coupled to inputs of decoder logic 60, which produces a N-bit output signal for the microprocessor 20. Reset inputs of the counters are coupled to a control line of the microprocessor 20.

The auto-correlator 12 examines the pulse train provided by the detail detector to determine whether there is any statistical significance to the pulse train that is indicative of the presence of a ghost signal. For example, assume that the main video signal is contaminated by a ghost signal which is delayed from the main signal by 350 nanoseconds. A pulse representative of a transition in the main signal will be clocked into the first shift register stage 30. Four clock cycles, or 279 nanoseconds, later, this pulse will have been shifted into the fifth shift register stage $30_5$. At the next clock cycle, a pulse representative of a corresponding transition of the ghost signal will be clocked into stage $30_1$. Simultaneously, the main signal pulse is clocked into stage $30_6$. In this condition, both inputs of AND gate $40_5$ will be enabled, and AND gate $40_5$ will produce a pulse which will increment counter $50_5$.

As these two pulses are shifted through register 30, the two pulses in combination will enable no further AND gates. However, as additional pulses are clocked into the register, the additional pulses in stage $30_1$ in combination with the first two individually will enable other AND gates dependent upon the locations of the first two pulses in the register. Additional counters will then be incremented, in an order which is dependent upon the appearance of signal transitions, and hence scene content. Over a significant number of video lines, different counters will accumulate different counts. However, pairs of corresponding main and ghost signal transition pulses will cause counter $50_5$ to accumulate a greater count than the other counters. When this counter produces an output pulse, or overflows, its signal is decoded by the decoder logic 60 into a digital word which identifies counter $50_5$. For a sixty-four counter register bank, a six bit word is sufficient to identify all counters individually (N=6). The microprocessor 20 then knows that a ghost signal exists which is delayed from the main signal by five times the clock cycle time, or $5 \times 70$ nsec, which is 350 nanoseconds. The microprocessor will then verify the presence of the ghost signal at this time during a training signal interval of the vertical blanking interval as described above, and adjust the delay line of the ghost cancellation system accordingly. The microprocessor 20 will then reset the counters and the auto-correlator will resume signal correlation to monitor the presence of the ghost signal.

The lengths of the shift register 30, AND gate array 40, and counter register bands 50 may be extended to examine a portion or all of a video line interval for ghost signal contamination. For a 14.32 MHz clock sampling rate, 910 shift register stages and 909 AND gates and counters will be required to detect ghost signals with delays up to a full line. A 512 stage register would conveniently provide a detection range of over one-half of a line for the ghost detector, which is an interval over which most ghost signals would be expected to be found.

What is claimed is:

1. A method for detecting ghost signal contamination of a video signal comprising the steps of:
   a. detecting a video signal comprising an active video vertical scanning interval and a vertical retrace interval;
   b. processing said video signal during said active video interval to produce signals indicative of the times of occurrence of transitions of said video signal during said active video interval; and
   c. measuring the time intervals between said signals indicative of said transitions of said video signal during said active video interval; and
   d. determining when the recurrence of one of said time intervals between said transitions of said video signal becomes statistically significant to identify the presence of ghost signal contamination.

2. The method of claim 1, wherein step b comprises the step of processing said video signal during said active video interval to produce a signal indicative of the times of occurrence of transitions of said video signal which exceed a given transition magnitude during said active video interval.

3. The method of claim 2, wherein step b comprises the steps of:

b1. differentiating said video signal to produce a sequence of transitions referenced to a reference level; and b2. producing a sequence of pulses in response to ones of said transitions of said sequence which are offset from said reference level by a given amplitude.

4. The method of claim 3, further comprising a step following step b1 comprising:

b3. passing transitions of only one polarity with respect to said reference level.

5. The method of claims 3 or 4, wherein step c comprises the step of:
measuring the time intervals between a pulse and all other pulses received during a preceding period of time; and wherein step d comprises the steps of:

d1. storing said time interval measurements; and d2. examining said stored time interval measurements after a given length of time to determine whether one time interval measurement occurs significantly more frequently than all others.

6. The method of claim 1, wherein said vertical retrace interval of said video signal includes a signal component suitable for use as a training signal, and further comprising the steps of:

e. examining said video signal at a time following the occurrence of said training signal by said recurring time interval to verify the presence of ghost signal contamination when step d. has indicated the presence of ghost signal contamination; and, if ghost signal contamination is verified;

f. adjusting the delay of a delay line in a ghost cancellation system to be substantially equal to said recurring time interval.

7. In a television receiver, including a source of video signals subject to contamination by ghost signals, apparatus for detecting the presence of a ghost signal comprising:
a signal detail detector, responsive to said video signals, for producing a signal sequence indicative of signal transitions during the picture information portion of said video signals;
measuring means having an input coupled to said signal detail detector, and responsive to said signal sequence for determining time intervals between ones of said transitions of said video signals; and
correlating means, coupled to said measuring means, and responsive to said determined time intervals, for producing a signal indicative of the detection of a ghost signal when a determined time interval value becomes statistically dominant.

8. The arrangement of claim 7, further including a microprocessor responsive to said signal produced by said correlating means, for adjusting the delay of a delay line of a ghost cancellation system to be substantially equal to said statistically dominant time interval.

9. The arrangement of claim 7, wherein said signal detail detector comprises:
means, responsive to said video signals, for producing a sequence of video signal transition pulses; and
means, responsive to said transition pulse sequence, for producing pulses when ones of said transition pulses exceed a given threshold.

10. The arrangement of claim 9, wherein said transition pulse producing means comprises a transversal filter; and
wherein said threshold pulse producing means comprises a comparator.

11. The arrangement of claim 10, wherein said signal detail detail detector further includes means, coupled between said transversal filter and said comparator, for passing transition pulses of a single polarity with respect to a reference level.

12. The arrangement of claims 7 or 11, wherein said measuring means includes a serial shift register having an input stage coupled to receive signals produced by said signal detail detector and a plurality of output tapped stages; and a plurality of coincidence means, each having a first input coupled to said input stage, and a second input coupled to respective ones of said output tapped stages for producing, at an output, signals indicative of the coincidence of signals at said first and second inputs.

13. The arrangement of claim 12, wherein said correlating means comprises a plurality of shift registers having respective inputs coupled to the outputs of respective ones of said coincidence means.

14. The arrangement of claim 13, wherein said correlating means further includes a decoder coupled to said shift registers for producing an output signal identifying that shift register which has accumulated the highest count during a preceding time interval.

* * * * *